(12) United States Patent
Zhou et al.

(10) Patent No.: US 11,794,506 B2
(45) Date of Patent: Oct. 24, 2023

(54) COATING COMPOSITION AND PRINTABLE MEDIUM

(71) Applicant: Hewlett-Packard Development Company, L.P., Spring, TX (US)

(72) Inventors: Xiaoqi Zhou, San Diego, CA (US); Zhang-Lin Zhou, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/417,358

(22) PCT Filed: Aug. 27, 2019

(86) PCT No.: PCT/US2019/048320
§ 371 (c)(1),
(2) Date: Jun. 22, 2021

(87) PCT Pub. No.: WO2021/040698
PCT Pub. Date: Mar. 4, 2021

(65) Prior Publication Data
US 2022/0195663 A1 Jun. 23, 2022

(51) Int. Cl.
| C09D 11/54 | (2014.01) |
| B41M 5/52 | (2006.01) |
| C09D 7/63 | (2018.01) |
| C09D 5/02 | (2006.01) |
| C09D 175/08 | (2006.01) |
| D06P 1/52 | (2006.01) |
| D06P 5/30 | (2006.01) |

(52) U.S. Cl.
CPC .......... *B41M 5/5281* (2013.01); *C09D 5/024* (2013.01); *C09D 7/63* (2018.01); *C09D 11/54* (2013.01); *C09D 175/08* (2013.01); *D06P 1/5285* (2013.01); *D06P 5/30* (2013.01)

(58) Field of Classification Search
CPC ........ B41M 5/5218; C09D 5/024; C09D 7/63; C09D 11/54; C09D 175/08; D06P 1/5285; D06P 5/30
USPC ....................................... 428/32.16
See application file for complete search history.

(56) References Cited

U.S. PATENT DOCUMENTS

| 5,589,532 | A | * | 12/1996 | Hargis | ............... | B32B 15/06 |
| | | | | | | 524/568 |
| 9,527,328 | B2 | | 12/2016 | Lubnin et al. | | |
| 2003/0175418 | A1 | * | 9/2003 | Muthiah | ............... | A61F 13/53 |
| | | | | | | 427/407.1 |

(Continued)

FOREIGN PATENT DOCUMENTS

| CN | 1375527 A | 10/2002 |
| CN | 104364086 | 2/2015 |

(Continued)

*Primary Examiner* — Betelhem Shewareged
(74) *Attorney, Agent, or Firm* — HP Inc. Patent Department

(57) ABSTRACT

A coating composition comprising water and polyurethane particles including cationic triphenyl-phosphonium salt functional groups. Also disclosed is a coated printable medium, with an image-side and a back-side, comprising a base substrate and the coating composition, such as described herein, that is applied over, at least, one side of the base substrate, forming an image-receiving layer. Also disclosed is the method for making such printable medium.

18 Claims, 3 Drawing Sheets

(56) References Cited

U.S. PATENT DOCUMENTS

| | | | |
|---|---|---|---|
| 2004/0002559 A1 | 1/2004 | Troutman et al. | |
| 2009/0239431 A1* | 9/2009 | Grablowitz | D06M 15/568 |
| | | | 427/430.1 |
| 2010/0160476 A1 | 6/2010 | Doring et al. | |
| 2013/0189516 A1 | 7/2013 | Sugino et al. | |
| 2013/0210303 A1 | 8/2013 | Doi et al. | |
| 2014/0134425 A1* | 5/2014 | Schubiger | C09D 167/00 |
| | | | 428/323 |
| 2016/0159107 A1 | 6/2016 | Niu | |
| 2019/0031829 A1 | 1/2019 | Ni et al. | |
| 2022/0195663 A1* | 6/2022 | Zhou | C08G 18/755 |

FOREIGN PATENT DOCUMENTS

| | | | |
|---|---|---|---|
| CN | 106661270 A | 5/2017 | |
| CN | 106750116 | 5/2017 | |
| CN | 107099131 | 8/2017 | |
| CN | 107347909 | 11/2017 | |
| CN | 107400492 A | 11/2017 | |
| CN | 108349284 | 7/2018 | |
| CN | 109937143 | 6/2019 | |
| CN | 109942629 | 6/2019 | |
| GB | 1355412 | 6/1974 | |
| JP | 2001288352 A | 10/2001 | |
| WO | WO-9961532 | 12/1999 | |
| WO | WO-2014076073 | 5/2014 | |
| WO | WO-2015126374 A1 * | 8/2015 | B41M 5/502 |
| WO | WO-2019143325 | 7/2019 | |
| WO | WO-2021021150 | 2/2021 | |

\* cited by examiner

COATING COMPOSITION AND PRINTABLE MEDIUM

BACKGROUND

Inkjet printing technology has expanded its application to large format high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric, textile and the like. The substrate plays a key role in the overall image quality and permanence of the printed images. Textile printing has various applications including the creation of signs, banners, artwork, apparel, wall coverings, window coverings, upholstery, pillows, blankets, flags, tote bags, etc. It is a growing and evolving area and is becoming a trend in the visual communication market. As the area of textile printing continues to grow and evolve, the demand for new coating compositions and printable mediums increases.

With these printing technologies, it is apparent that the image quality of printed images is strongly dependent on the construction of the recording media used. Pre-treatment compositions or coatings can be applied to various media to improve printing characteristics and attributes of a printed image.

BRIEF DESCRIPTION OF THE DRAWINGS

The drawings illustrate various examples of the present fabric printable medium and are part of the specification.

DETAILED DESCRIPTION

Figure 1:
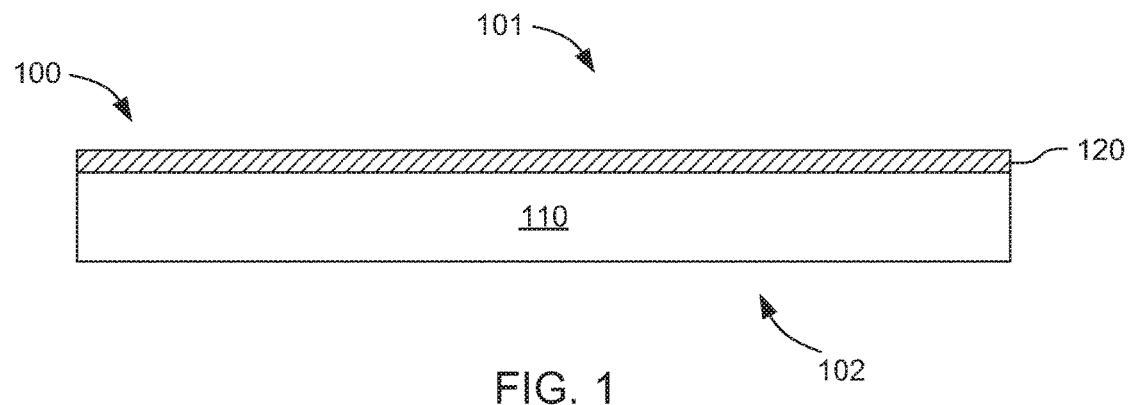
FIG. 1, FIG. 2 and FIG. 3 are a cross-sectional view of the printable medium according to some examples of the present disclosure.

When printing on media substrates, specifically on fabric substrates, challenges exist due to the specific nature of media and of the fabrics. Indeed, often, some media such as fabric does not accurately receive inks. Some fabrics, for instance, can be highly absorptive, diminishing color characteristics, while some synthetic fabrics can be crystalline, decreasing aqueous ink absorption leading to ink bleed. These characteristics result in the image quality on fabric being relatively low. Additionally, black optical density, color gamut, and sharpness of the printed images are often poor compared to images printed on fabrics or other media types. Durability, such as rubbing resistance, is another concern when printing on fabric, particularly when pigmented inks and ink compositions containing latex are used. To overcome these challenges, a functional coating, such as an image-receiving coating, is applied to the surface of the fabric substrate. However, since coating compositions contain some flammable substances such as polymeric binders, when such fabric printing media is intended to be used in close proximity to indoor environments (as drapes, as overhead signage, as part of furnishings, or the like), there are concerns about flame resistance as well as about using coatings that increase the flammability of the fabric. Thus, fire/flame resistance or inhibition characteristics of the coating compositions are also desirable when providing printable fabrics.

In one example, the present disclosure is drawn to a coating composition comprising water and polyurethane particles including cationic triphenyl-phosphonium salt functional groups. In some other examples, the present disclosure relates to a coated printable medium, with an image-side and a back-side, comprising a base substrate and a coating composition applied over, at least, one side of the base substrate, forming an image-receiving layer, and comprising water and polyurethane particles including cationic triphenyl-phosphonium salt functional groups. The present disclosure also relates to a method for forming said coated printable medium.

The present technology relates to coating compositions for print media. Such coating composition can be applied to various media to improve, for example, printing characteristics and attributes of an image. In some examples, the coating composition is a composition that is going to be applied to an uncoated printable recording media. By "uncoated", it is meant herein that the printable recording media has not been treated or coated by any composition. By "coated", it is meant herein that the printable recording media has been applied a composition. It is noted that the term "coating composition" refers to either a composition used to form a coating layer as well as the coating layer itself, the context dictating which is applicable. For example, a coating composition or coating that includes an evaporable solvent is referring to the compositional coating that is applied to a media substrate. Once coated on a media substrate and after the evaporable solvent is removed, the resulting coating layer can also be referred to as a coating.

The present technology relates also to printable medium comprising a coating composition. In some specific examples, the printable medium is a fabric printable medium. When coated with the coating composition according to the present disclosure, the printable recording medium (or printable media) provide printed images that have outstanding print durability and excellent scratch resistance while maintaining good printing image quality (i.e. printing performance). In addition, the printable medium, when coated with the coating composition according to the present disclosure, has good flame resistance properties.

By "scratch resistance", it is meant herein that the composition is resistant to any modes of scratching which include, scuff and abrasion. By the term "scuff", it is meant herein damages to a print due to dragging something blunt across it (like brushing fingertips along printed image). Scuffs do not usually remove colorant, but they do tend to change the gloss of the area that was scuffed. By the term "abrasion", it is meant herein the damage to a print due to wearing, grinding or rubbing away due to friction. Abrasion is correlated with removal of colorant (i.e. with the OD loss). In some examples, the fabric printable medium described herein is a coated printable media that can be printed at speeds needed for commercial and other printers such as, for example, HP Latex printers such as 360, 560, 1500, 3200 and 3600 (HP Inc., Palo Alto, CA, USA). By using coating compositions on printable medium, the printing process is more accurate, and the printed image is more permanent. The resultant printed media will also be able to provide fire/flame resistance or inhibition to the media.

Figure 2:
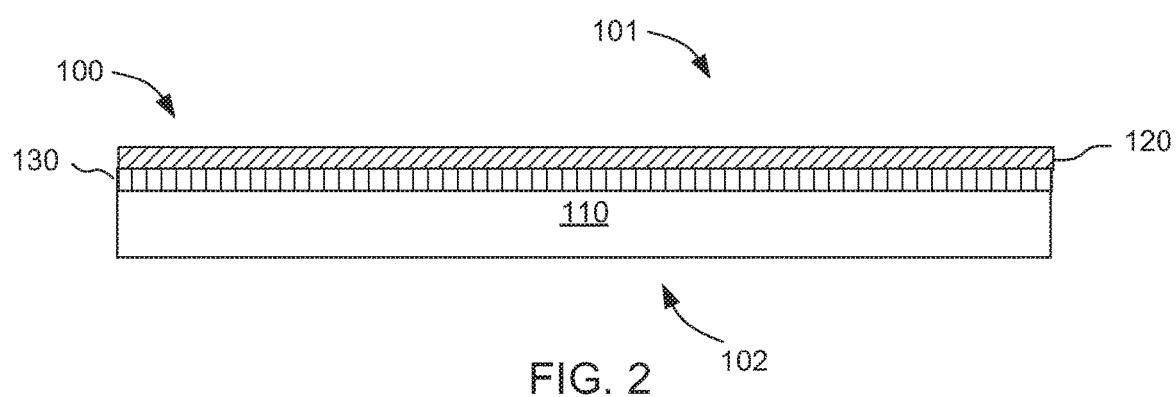
Figure 3:
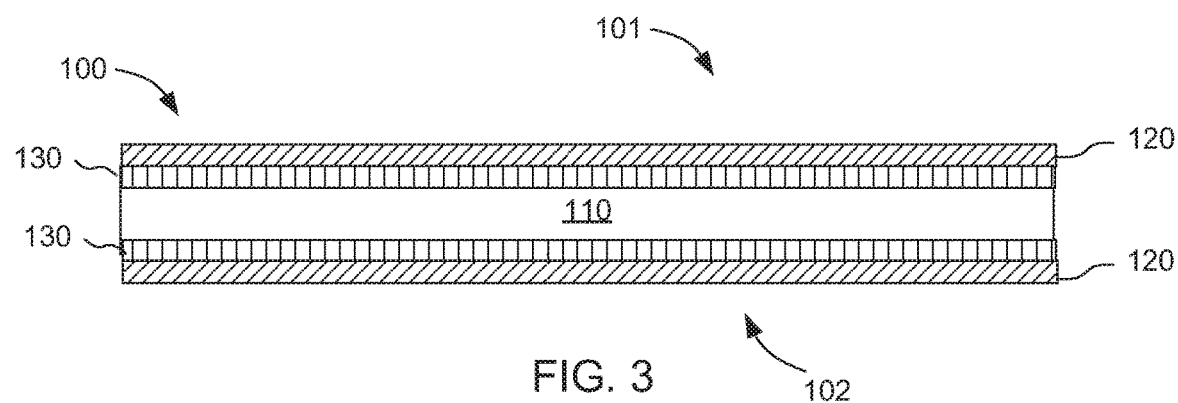

FIG. 1, FIG. 2 and FIG. 3 schematically illustrate some examples of the printable medium (100) as described herein.

Figure 4:
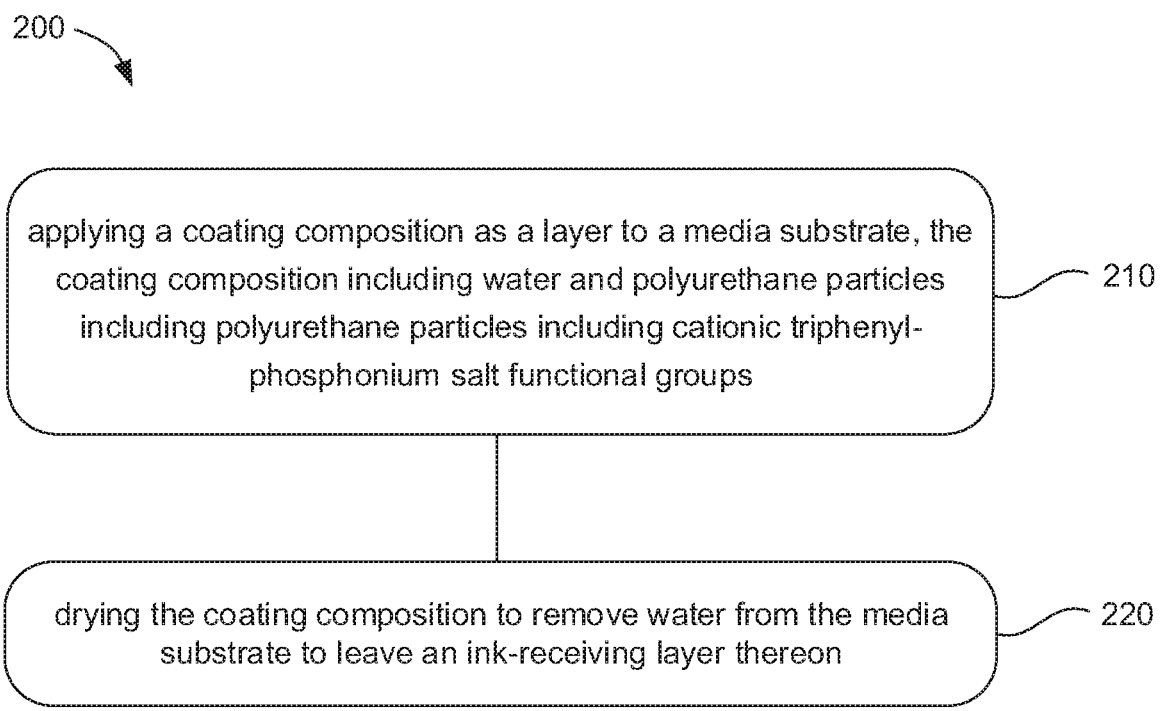
FIG. 4 is a flowchart illustrating a method for producing the printable medium according to one example of the present disclosure.
Figure 5:
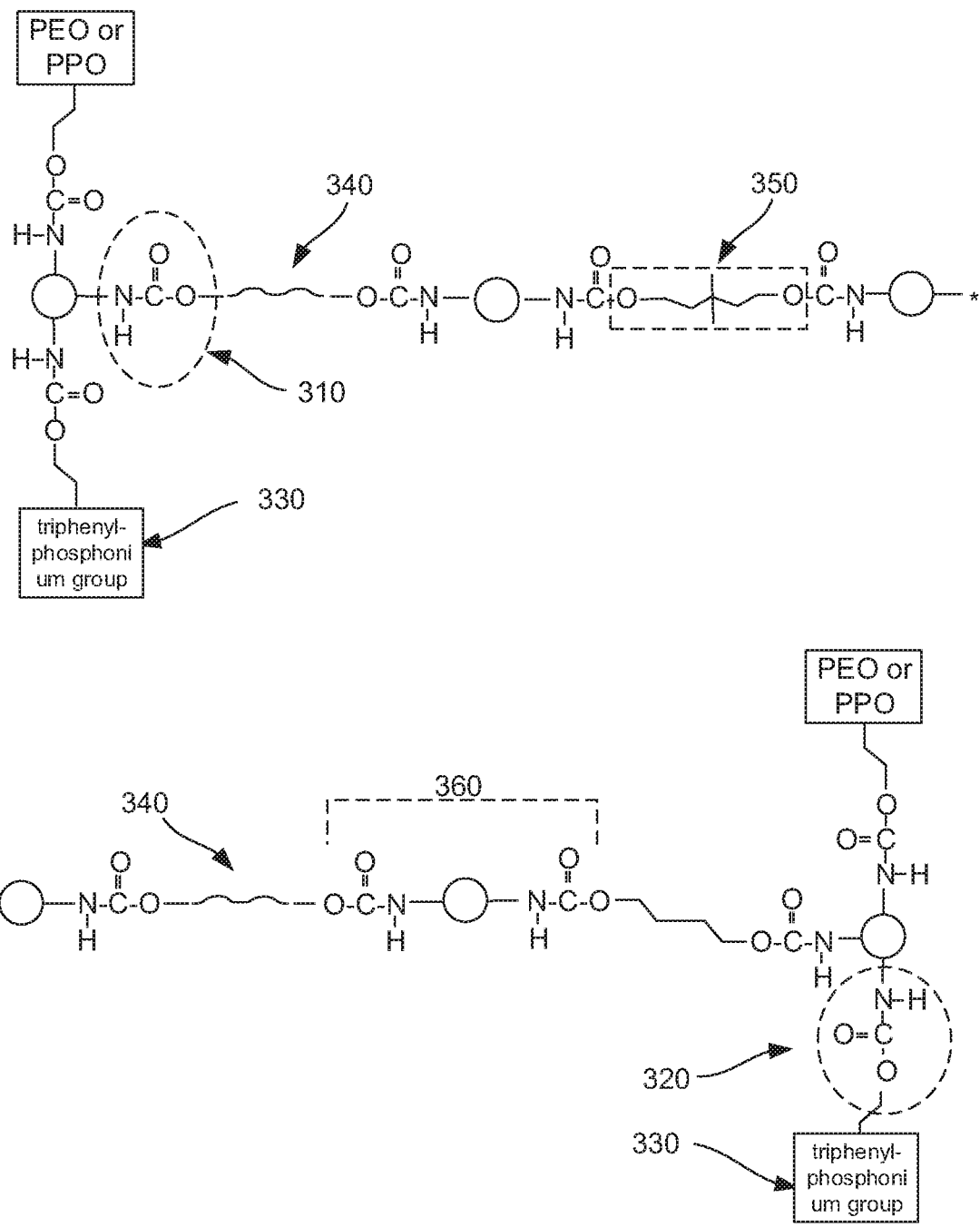
FIG. 5 is an example portions of polyurethane particles that can be included in coating compositions and print media coatings in accordance with the present disclosure.

FIG. 4 is a flowchart illustrating an example of a method for producing the printable medium. FIG. 5 is an example portions of polyurethane particles that can be included in coating compositions and print media coatings described herein.

As will be appreciated by those skilled in the art, FIG. 1, FIG. 2 and FIG. 3 illustrate the relative positioning of the various layers of the printable media without necessarily illustrating the relative thicknesses of the various layers. It is to be understood that the thickness of the various layers is exaggerated for illustrative purposes.

FIG. 1 illustrates the printable recording media (100) as described herein. The printable media (100) encompasses a base substrate or media substrate or bottom supporting substrate (110) and a coating layer (120) that result from the application of the coating composition as described herein. The coating composition is applied on, at least, one side of the substrate (110) in order to form an image-receiving layer (120). The pre-treatment composition is thus applied on one side, i.e. the image side, only and no other coating is applied on the opposite side. The image side with the image-receiving layer is considered as the side where the image will be printed. The printable medium (100) has two surfaces: a first surface which might be referred to as the "image-receiving side", "image surface" or "image side" (101) when coated with the image-receiving layer and the primary layer, and a second surface, the opposite surface, which might be referred to as the "back surface" or "back-side" (102).

FIG. 2 illustrates another example of the printable recording media (100) as described herein. The printable media (100) encompasses a base substrate (110), a primary layer (130) applied on, at least, one side of the base substrate, over the base substrate (110) and below the image-receiving coating layer (120) that result from the application of the coating composition as described herein. In some examples, such as illustrated in FIG. 2, the fabric printable medium (100) encompasses thus a fabric base substrate (110), a primary layer (130) and an image-receiving coating layer (120) applied only on the image-side (101) of the printable media (100).

In yet some other examples, such as illustrated in FIG. 3, the printable medium (100) encompasses a base substrate (110) with primary layers (130) that are applied on both sides, on the image (101) and on the back-side (102), of the base substrate (110). Image-receiving coating layers (120) are applied over both primary layer (130) on both sides of the printable media (100). In theory, both the image side and the back-side could thus be printed. Further in another example, (not illustrated) the printable medium (100) encompasses a base substrate (110) with only image receiving layer image (120) on the both front side (101) and back-side (102), of the base substrate (110). In theory, both the image side and the back-side could be printed and functionalized as image-receiving layer.

An example of a method (200) for forming a printable medium in accordance with the principles described herein, by way of illustration and not limitation, is shown in FIG. 4. As illustrated in FIG. 4, such method encompasses applying a coating composition as a layer to a media substrate, the coating composition including water and polyurethane particles including polyurethane particles including cationic triphenyl-phosphonium salt functional groups (210) and drying the coating composition to remove water from the media substrate to leave an ink-receiving layer thereon (220) in order to obtain the printable medium.

The coating composition comprises water and polyurethane particles including cationic triphenyl-phosphonium salt functional groups. When applied on a printable medium, the coating composition, that comprises water and polyurethane particles including cationic triphenyl-phosphonium salt functional groups, will form the image-receiving coating layer.

The polyurethane particles of the present disclosure include cationic triphenyl-phosphonium salt functional groups. The polyurethane particles are under the form of a dispersions, i.e. are polyurethane particles dispersions. Without being bonded by any theory, it is believed that these polyurethane particles including cationic triphenyl-phosphonium salt functional groups have several functions: a binder function, a flame-retardant function and a fixer function. The polyurethane particles including cationic triphenyl-phosphonium salt functional groups can also have film forming properties and can be constituted into a polymeric film or at least in part of polymeric film in coating composition.

As "flame-retardant", or "fire-retardant", it is meant herein any substance (i.e. agent) that inhibits or reduces flammability or reduces their combustion of the substance (i.e. herein the media) containing it. In other word, the flame-retardant agent will have flame or fire retardancy properties.

In some examples, the polyurethane particles include cationic triphenyl phosphonium salt functionality, isocyanate-generated amine groups, and polyalkylene oxide side-chains. In some other examples, the polyalkylene oxide side-chains can include polyethylene oxide side-chains, polypropylene oxide side-chains, or a combination thereof.

The polyurethane particles of the present disclosure can have a D50 particle size over 1 μm. In some other examples, the polyurethane particles have a D50 particle size ranging from about 1 to about 10 μm. "D50" particle size is defined as the particle size at which about half of the particles are larger than the D50 particle size and about half of the other particles are smaller than the D50 particle size (by weight based on the metal particle content of the particulate build material). As used herein, particle size with respect to the polyurethane particles can be based on volume of the particle size normalized to a spherical shape for diameter measurement, for example. Particle size can be collected using a Malvern Zetasizer, for example. Particle size information can also be determined and/or verified using a scanning electron microscope (SEM).

In some examples, the polyurethane particles have an acid number of about 0 mg KOH/g. The term "acid value" or "acid number" refers to the mass of potassium hydroxide (KOH) in milligrams that can be used to neutralize one gram of substance (mg KOH/g), such as the polyurethane disclosed herein. This value can be determined, in one example, by dissolving or dispersing a known quantity of a material in organic solvent and then titrating with a solution of potassium hydroxide (KOH) of known concentration for measurement.

In some example of the present disclosure, the polyurethane particles include triphenyl-phosphonium salt functional groups, have an acid number of about 0 mg KOH/g, have a D50 particle size that is over 1 μm and comprise polyalkylene oxide side-chains. In some other examples, the polyurethane particles include triphenyl-phosphonium salt functional groups, have an acid number of about 0 mg KOH/g, have a D50 particle size that is over 1 μm and comprises polyalkylene oxide side-chains that include polyethylene oxide (PEO) side-chains, polypropylene oxide (PPO) side-chains, or a combination thereof.

In some examples, the polyurethane particles include cationic triphenyl-phosphonium salt functionality, isocyanate-generated amine groups, and polyalkylene oxide side-chains. The term "isocyanate-generated amine groups" refers to amino (—NH2) groups that can be generated from excess isocyanate (NCO) groups that are not utilized when forming the polymer precursor, typically present as terminal groups; or to secondary amine (—NH—) groups that may be isolated from other functional groups present along the polymer backbone, e.g., —CH2CH2—NH—CH2—. These groups can be generated from excess isocyanate (NCO) groups that are not utilized when forming polymer precursor or at other stages in the reaction/preparation of the polyurethane polymer. Upon reacting with water (rather than being used to form the polymer backbone with a diol) the excess isocyanate group can release carbon dioxide, leaving an amino or secondary amine group where the isocyanate group was previously present. The isocyanate-generated amine groups, on the other hand, can be generated from excess isocyanate (NCO) groups that are not utilized when forming the polymer precursor, as also mentioned. In further detail, the isocyanate-generated amine groups can be present on the polyurethane particles at from 0 wt % to 8 wt % compared to a total weight polyurethane particle.

The polyalkylene oxide side-chains can include polyethylene oxide side-chains, polypropylene oxide side-chains, or a combination thereof. The polyalkylene oxide side-chains can have a number average molecular weight from 500 Mn to 15,000 Mn, or from 1,000 Mn to 12,000 Mn, from 2,000 Mn to 10,000 Mn, or from 3,000 Mn to 8,000 Mn.

By way of example, the polyurethane particles of the present disclosure can be prepared, in one example, by reacting a diisocyanate with a polymer diol, in the presence of a catalyst in acetone under reflux, to give a compound ready for grafting in the polyethylene oxide (PEO) and/or polypropylene oxide (PPO). Thus, pre-polymer synthesis can include reaction of a diisocyanate with polymeric diol, for example. The term "aliphatic" as used herein includes saturated C2 to C16 aliphatic groups, such as alkyl groups, alicyclic groups, combinations of alkyl and alicyclic groups, etc., and can include straight-chain alkyl, branched alkyl, alicyclic, branched alkyl alicyclic, straight-chain alkyl alicyclic, alicyclic with multiple alkyl side chains, etc.

The reaction can occur in the presence of a catalyst in acetone under reflux to give the pre-polymer, in one example. In some specific examples, other reactants may also be used in certain specific examples, such as organic acid diols (in addition to the polymeric diols) to generate acidic moieties along the backbone of the polyurethane particles. Thus, in addition to diols that may be used to react with the isocyanate groups to form the urethane linkages, a carboxylated diol may likewise be used to react with the diisocyanates to add carboxylated acid groups along a backbone of the polyurethane polymer of the polyurethane particles.

The pre-polymer can be prepared with excess isocyanate groups that compared the molar concentration of the alcohol groups found on the polymeric diols or other diols that may be present. By retaining excess isocyanate groups, in the presence of water, the isocyanate groups can generate amino groups or secondary amines along the polyurethane chain, releasing carbon dioxide as a byproduct. This reaction can occur at the time of chain extension during the process of forming the polyurethane particles. Once the pre-polymer is formed, the polyurethane particles can be generated by reacting the pre-polymer with mono-substituted polyethylene oxide (PEO) alcohol and/or polypropylene oxide (PPO) alcohol, and then with cationic triphenyl-phosphonium base alcohol/salt functional groups, to form the polyurethane particles that include cationic triphenyl-phosphonium salt functional groups. As noted in preparing the pre-polymer, with an excess of isocyanate groups and with the reaction with water, the polyethylene particles also include isocyanate-generated amine groups as well. Next, more water can be added and solvent can be removed by vacuum distillation in some examples, thus, suspending the polyurethane particles in a higher concentration of water.

An example preparation scheme is shown in Table 1 below, which sets for various steps in one example sequence, as follows:

TABLE 1

| Step | | |
|---|---|---|
| 1 | Initial Reactants | Diisocyanate + Polymeric Diol + Catalyst/Acetone → |
| 2 | Prepolymer | Formation Backbone Including Excess Isocyanate Groups and Urethane Linkages Generated from Polymeric Diols |
| 3 | Polyalkylene Oxide Alcohol Reactant | OH-PEO and/or OH-PPO → |
| 4 | Intermediate Polymer | Prepolymer Modified with Polyalkylene Pendant Groups Attached Via Urethane Linkages with Excess Isocyanate Groups Remaining |
| 5 | Triphenyl-phosphonium Reactant | cationic triphenyl-phosphonium base alcohol |
| 6 | Acidified Polymer | Intermediate Polymer Modified with cationic triphenyl-phosphonium salt functional groups with Excess Isocyanate Groups Remaining |
| 7 | Aqueous Dispersion | Water (Remove Acetone) → |
| 8 | Polyurethane Particles Dispersed in Water | Polyurethane Particle Dispersion Including cationic triphenyl-phosphonium salt functional group, Isocyanate-Generated Amine Groups, and Polyalkylene oxide Side-Chains |

Notably, the excess isocyanate groups can be converted to the isocyanate-generated amine groups at any of the stages shown in Table 1 above when there is water for the reaction. Any of the isocyanate groups that may be still be present when water is added would at that point be converted to the isocyanate-generated amine groups. These amine groups can be available for crosslinking, for example.

FIG. 5 provides example portions of polyurethane particles that can be formed, for example, in accordance with the preparative scheme of Table 1 above or other similar reaction schemes. FIG. 5 does not show the cross-linking, but rather shows the types of groups or moieties that can be present along the polymer of the polyurethane particles, some of which can be available for internal crosslinking.

In FIG. 5, the polyurethane polymer portions shown identify several urethane linkage groups 310, urea groups 320, triphenyl-phosphonium groups 330, polymerized polymeric diols 340, and polymerized nonionic aliphatic diols 350. Notably, the polymerized polymeric diols and the polymerized nonionic aliphatic diols liberate hydrogens at their hydroxyl moieties to form the urethane linkage groups in some locations. As shown also in FIG. 5, polymerized diisocyanates 360 are also shown, which include urethane linkage groups on either side of a central moiety, with the central moiety being generically as a circle. The central moiety of the polymerized diisocyanates may be provided from any of the diisocyanates shown and/or described herein, or any of a number of other diisocyanates, or can also be representative of multiple different types of diisocyanates used in combination. Thus, the central moieties (shown as a circle) from the diisocyanates can actually be different at the various locations where this central moiety, or circle, is shown in FIG. 5. As another example, there can also be other types of compounds included in the polymerized polyurethane particles beyond that which is shown in Table 1.

In more specific detail regarding the initial reactants and then additional reactants that can be used in forming the polyurethane particles, example diisocyanates that can be used to prepare the pre-polymer include 2,2,4 (or 2, 4, 4)-trimethylhexane-1,6-diisocyanate (TMDI), hexamethylene diisocyanate (HDI), methylene diphenyl diisocyanate (MDI), isophorone diisocyanate (IPDI), and/or 1-Isocyanato-4-[(4-isocyanatocyclohexyl)methyl]cyclohexane (H12MDI), etc., or combinations thereof, as shown below. Others can likewise be used alone, or in combination with these diisocyanates, or in combination with other diisocyanates not shown.

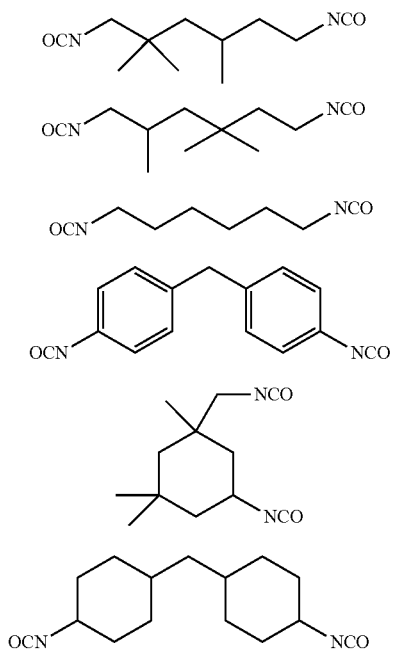

TMDI

HDI

MDI

IPDI

H122MDI

In further detail, there are also polymeric diols that can be used in preparing the polyurethane particles of the present disclosure. Example polymeric diol include polyester diols or a polycarbonate diol, for example. Other polymeric diols that can be used include polyether diols, or even combination diols, such as a combination that could be used to form a polycarbonate ester polyether-type polyurethane. In one specific example, however, the polyurethane particles can include polyester polyurethane moieties.

With more specific reference to the polyalkylene oxide moieties that can be included, these can be grafted onto the polymer backbone by reacting the pre-polymer with mono-substituted polyalkylene oxide alcohol, such as polyethylene oxide (PEO) alcohol and/or polypropylene oxide (PPO) alcohol, for example. The polyalkylene oxide side-chains that are added or grafted to the polymer backbone can have a number average molecular weight from 500 Mn to 15,000 Mn, from 1,000 Mn to 12,000 Mn, from 2,000 Mn to 10,000 Mn, or from 3,000 Mn to 8,000 Mn, for example. Within these ranges of repeating C2-C3 alkyl oxide groups, poly-propylene oxide groups can provide greater weight average molecular weight to the side-chain compared to polyethylene oxide, as there are three carbons present per oxygen compare to two carbons per oxygen. In some examples the polyalkylene oxide side-chains can also be a combination of both C2 alkyl oxide groups and C3 alkyl oxide groups.

The polyurethane dispersions particles of the present disclosure comprise triphenyl-phosphonium salt. In some examples, the polyurethane particles dispersions of the present disclosure comprise substituted phenyl phosphonium salt-based alcohols. Said substituted phenyl phosphonium salt-based alcohols could be made according to the reaction described below:

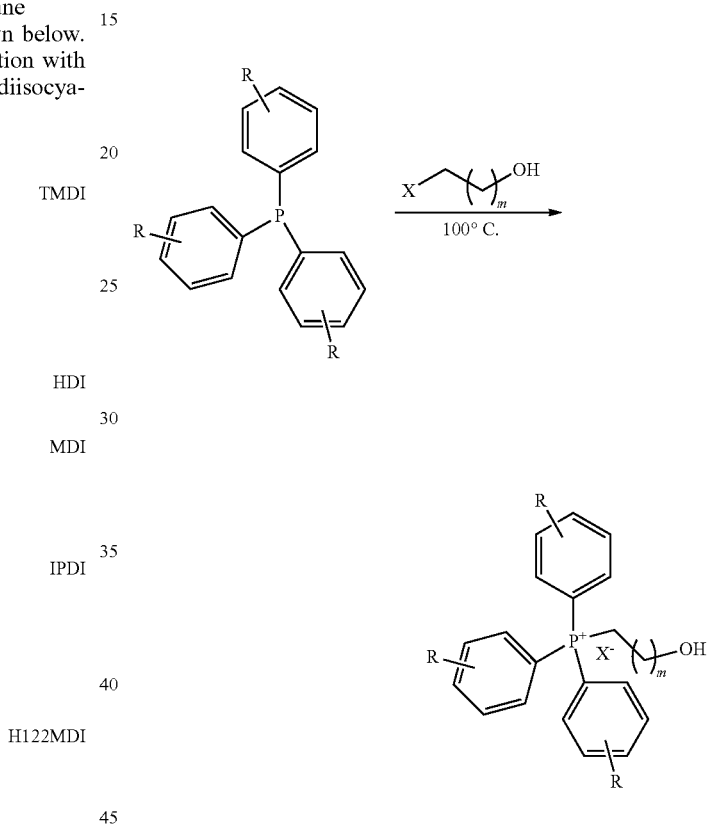

Wherein, R can be H or other simple alkyl groups such as methyl, ethyl, isopropyl and tert-butyl (or another alkyl group); m can be from 1 to 10 and X can be Br, Cl or I. In this reaction, the triphenyl phosphine compound is reacted at high temperature with alcohols in order to obtain substituted tri-phenyl phosphonium salt-based alcohols.

Scheme below shows examples of substituted phenyl phosphonium salt-based alcohols.

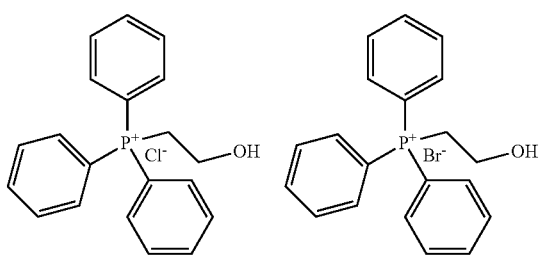

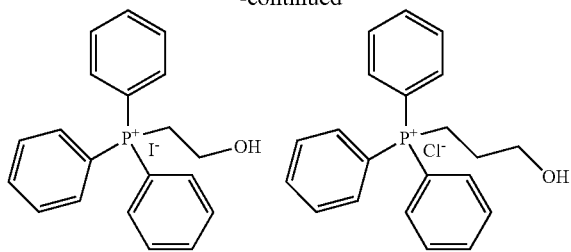
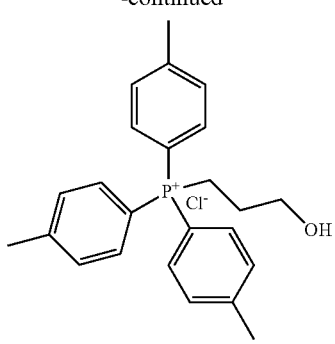
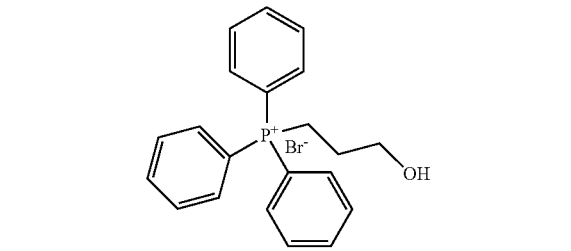
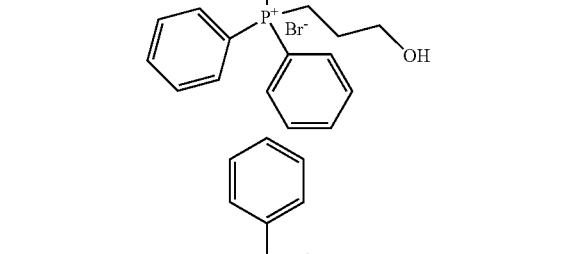
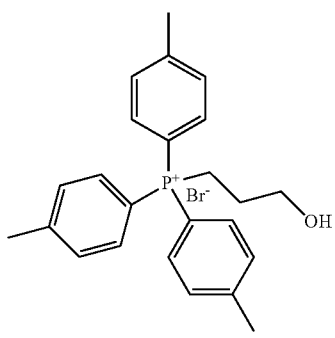
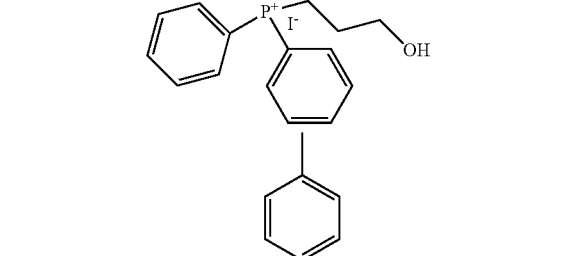
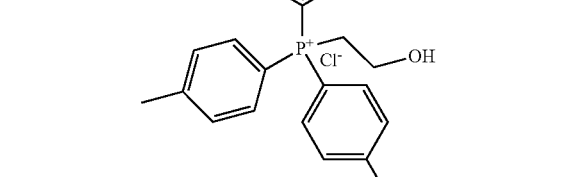
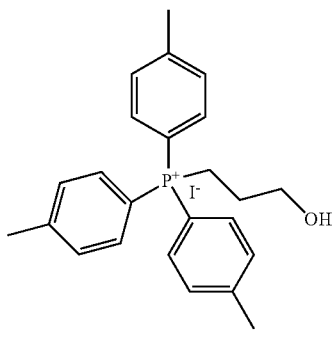
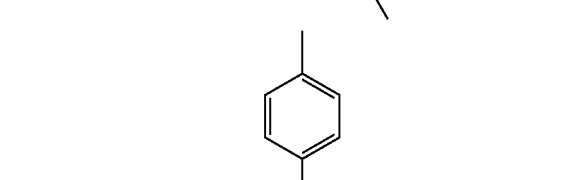
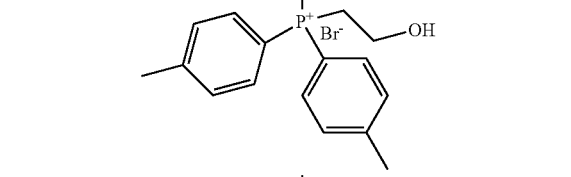
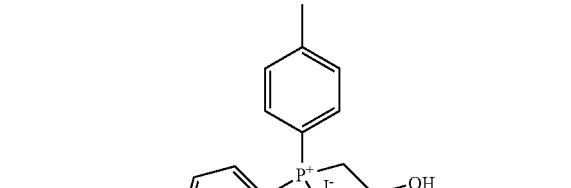
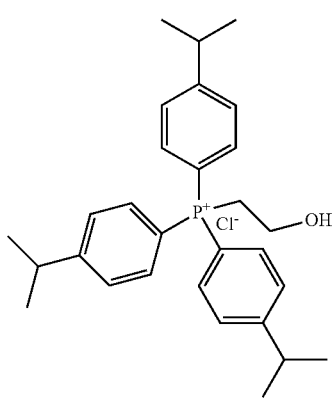
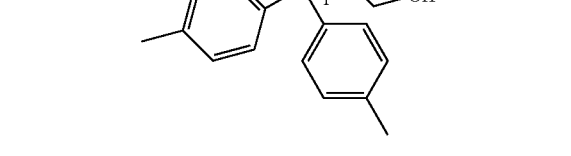

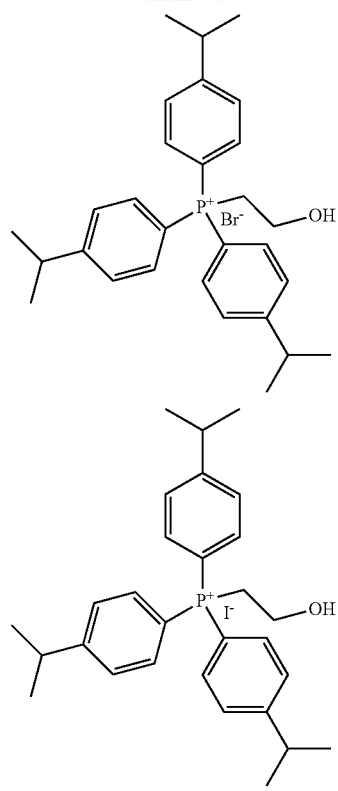
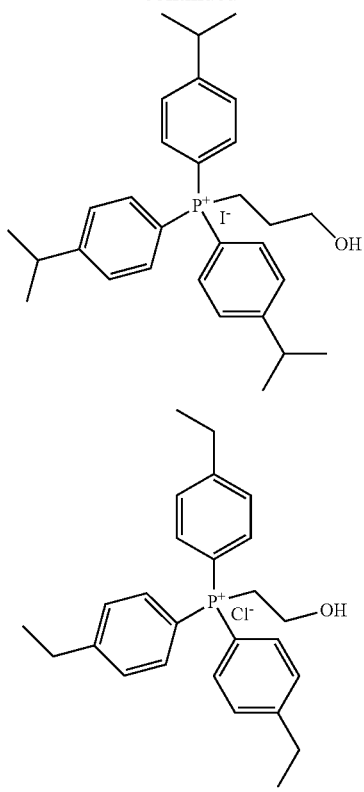
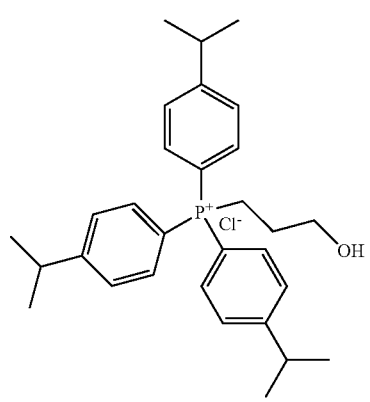
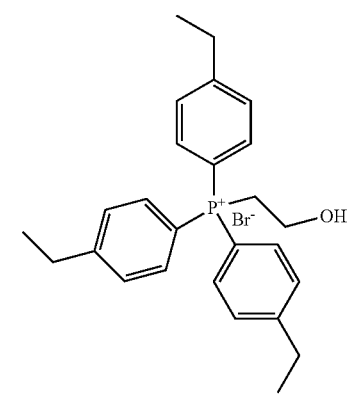
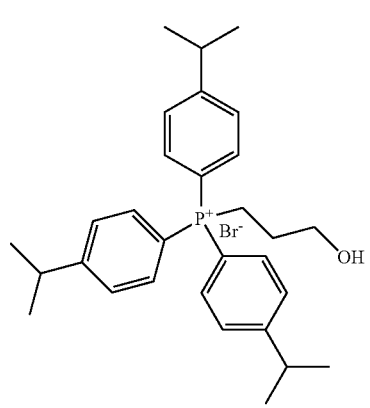
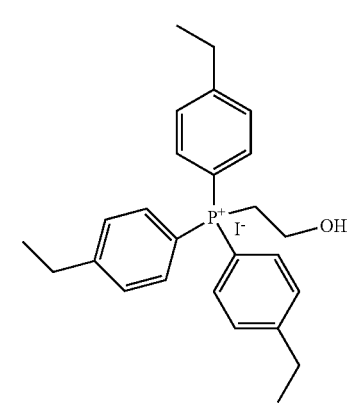

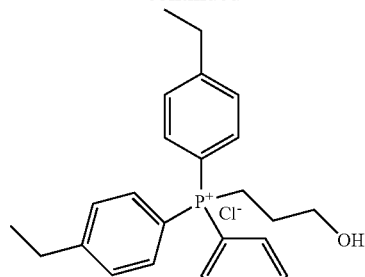
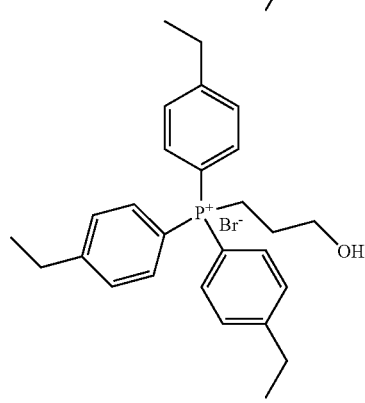
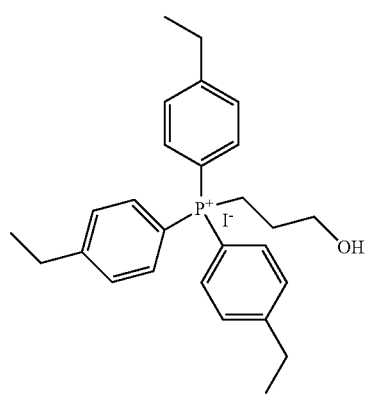
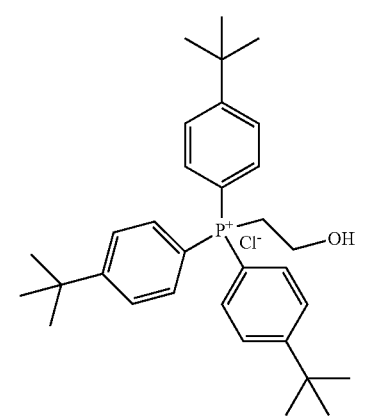
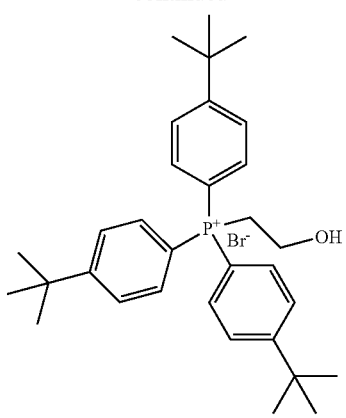
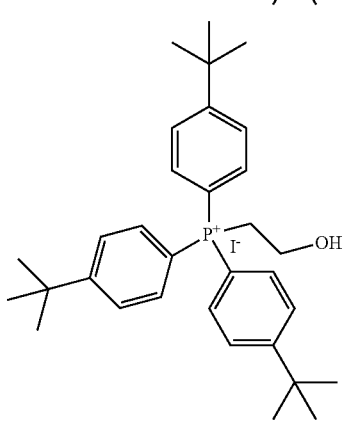
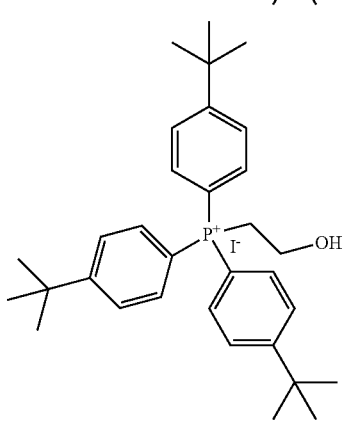
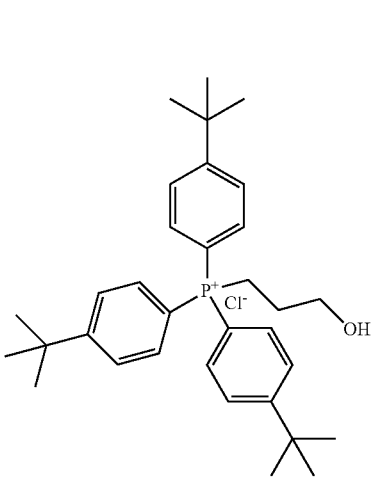

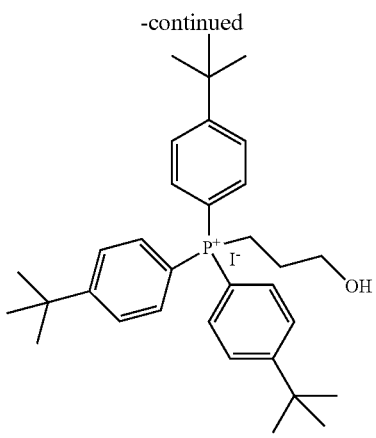

The flame-retardant polyurethane dispersion with cationic triphenyl phosphonium salt functional groups are present, in the coating layer composition, in an amount representing from about 1 to about 70 wt % by total weigh of the coating layer composition. In some other examples, the flame-retardant dispersion can be present in an amount representing from about 10 wt % to about 50 wt %, by total dry weight of the coating layer composition. In some examples, the coating composition comprises a polyurethane dispersion with cationic triphenyl phosphonium salt functional groups. Optionally, other polymeric materials, such as non-flame-retardant polymers, cross-linkers inorganic fillers and processing aids like surfactants, PH control agents and coating thickening agents can be included into the coating composition.

In some examples, the coating composition, that will form the image-receiving layer, can further comprise crosslinked polymeric networks. In some other examples, the coating composition can further comprise a first and a second crosslinked polymeric network. The wording "polymer network" refers herein to a polymer and/or a polymer mixture which can be self-cross-linked, by reaction of different function groups in the same molecular chain, or inter-cross-linked by reaction with another compound which has different function group. The first crosslinked polymeric network and the second crosslinked polymeric network can be either different or identical by their chemical natures.

In some examples, the coating composition, forming the image-receiving layer, comprises a first crosslinked polymeric network and a second crosslinked polymeric network that are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

In some examples, the first crosslinked polymeric network can be crosslinked to itself. In another example, the first crosslinked polymeric network can be crosslinked to itself and to the second crosslinked polymeric network. In one example, the second crosslinked polymeric network can be crosslinked to itself. When the first crosslinked polymeric network and the second crosslinked polymeric network are not crosslinked to one another they can be entangled or appear layered onto one another.

The first and second crosslinked polymeric networks can be present in the coating composition in a variety of amounts. The first and second crosslinked polymeric networks can collectively represent from about 60 wt % to about 99 wt % of the total weight of the image-receiving layer. In another example, the first and second crosslinked polymeric networks can collectively represent from about 70 wt % to about 95 wt % of the total weight of the image-receiving layer. In a further example, the first and second crosslinked polymeric networks can collectively range from about 85 wt % to about 93 wt % of the total weight of the image-receiving layer. In some examples, the first and second crosslinked polymeric networks can be present in equal amounts. In other examples, the first and second crosslinked polymeric networks can be present in different amounts.

In some examples, in the image-receiving coating composition, the first crosslinked polymeric network and the second crosslinked polymeric network are different and independently comprises polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof. The first and/or the second crosslinked polymeric networks can include a polyacrylate, polyurethane, vinyl-urethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, derivative thereof, or combination thereof. In some examples, the first and second crosslinked polymeric networks can be different polymers.

In one example, the first and/or the second crosslinked polymeric network can include a polyacrylate based polymer. Exemplary polyacrylate based polymers can include polymers made by hydrophobic addition monomers include, but are not limited to, C1-C12 alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethyl acrylate, hydroxyethyl methacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, C1-C12 alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido) methylene), and combinations thereof.

In some examples, the first and/or the second crosslinked polymeric network can be formed by using self-cross-linked polyurethane polymers or cross-linkable polyglycidyl or polyoxirane resins. In some other examples, the first and/or second crosslinked polymeric network can be formed by using self-cross-linked polyurethane polymers. The self-cross-linked polyurethane polymer can be formed by reacting an isocyanate with a polyol. Exemplary isocyanates used to form the polyurethane polymer can include toluenediisocyanate, 1,6-hexamethylenediisocyanate, diphenyl-methanediisocyanate, 1,3-bis(isocyanatemethyl)cyclohexane, 1,4-cyclohexyldiisocyanate, p-phenylenediisocyanate, 2,2,4(2,4,4)-trimethylhexamethylenediisocyanate, 4,4'-dicychlohexylmethanediisocyanate, 3,3'-dimethyldiphenyl, 4,4'-diisocyanate, m-xylenediisocyanate, tetramethylxylenediisocyanate, 1,5-naphthalenediisocyanate, dimethyl-triphenyl-methane-tetra-isocyanate, triphenyl-methane-tri-isocyanate, tris(iso-cyanate-phenyl) thiophosphate, and combinations thereof. Commercially available isocyanates can include Rhodocoat® WT 2102 (available from Rhodia AG, Germany), Basonat® LR 8878 (available from BASF Corporation, N. America), Desmodur® DA, and Bayhydur® 3100 (Desmodur® and Bayhydur® are available from Bayer AG, Germany). In some examples, the isocyanate can be protected from water. Exemplary polyols can include 1,4-butanediol; 1,3-propanediol; 1,2-ethanediol; 1,2-propanediol; 1,6-hexanediol; 2-methyl-1,3-propanediol; 2,2-dimethyl-1,3-propanediol; neopentyl glycol; cyclo-hexane-dimethanol; 1,2,3-propanetriol; 2-ethyl-2-hydroxymethyl-1,3-propanediol; and combinations thereof.

The polyurethane chain can have a trimethyloxysiloxane group and cross-link action can take place by hydrolysis of the function group to form silsesquioxane structure. The polyurethane chain can also have an acrylic function group, and the cross-link structure can be formed by nucleophilic addition to acrylate group through aceto-acetoxy functionality. In some other examples, the first and/or second cross-linked polymeric network is formed by using vinyl-urethane hybrid copolymers or acrylic-urethane hybrid polymers. In yet some other examples, the polymeric network includes an aliphatic polyurethane-acrylic hybrid polymer. Representative commercially available examples of the chemicals which can form a polymeric network include, but are not limited to, NeoPac®R-9000, R-9699 and R-9030 (from Zeneca Resins), Sancure® AU4010 (from Lubrizol) and Hybridur®570 (from Air Products).

In one example, the weight average molecular weight of the polyurethane polymer used in the first and/or second crosslinked polymer can range from about 20,000 Mw to about 200,000 Mw as measured by gel permeation chromatography. In another example, the weight average molecular weight of the polyurethane polymer can range from about 40,000 Mw to about 180,000 Mw as measured by gel permeation chromatography. In yet another example, the weight average molecular weight of the polyurethane polymer can range from about 60,000 Mw to about 140,000 Mw as measured by gel permeation chromatography.

Exemplary polyurethane polymers can include polyester based polyurethanes, U910, U938 U2101 and U420; polyether-based polyurethane, U205, U410, U500 and U400N; polycarbonate-based polyurethanes, U930, U933, U915 and U911; castor oil-based polyurethane, CUR21, CUR69, CUR99 and CUR991; and combinations thereof. (These polyurethanes are available from Alberdingk Boley Inc., North Carolina, USA).

The polymeric network (the first and/or second) can include a polymeric core that is, at least, one polyurethane. The polyurethanes include aliphatic as well as aromatic polyurethanes. The polyurethane is typically the reaction products of the following components: a polyisocyanate having at least two isocyanate functionalities (—NCO) per molecule with, at least, one isocyanate reactive group such as a polyol having at least two hydroxy groups or an amine. Suitable poly-isocyanates include diisocyanate monomers, and oligomers. Examples of polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. In some other, the polyurethanes are aromatic polyether polyurethanes, aliphatic polyether polyurethanes, aromatic polyester polyurethanes, and aliphatic polyester polyurethanes. Representative commercially available examples of polyurethanes include Sancure® 2710 and/or Avalure® UR445 (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure® 878, Sancure® 815, Sancure® 1301, Sancure® 2715, Sancure® 2026, Sancure® 1818, Sancure® 853, Sancure® 830, Sancure® 825, Sancure® 776, Sancure® 850, Sancure® 12140, Sancure® 12619, Sancure® 835, Sancure® 843, Sancure® 898, Sancure® 899, Sancure® 1511, Sancure® 1514, Sancure® 1517®, Sancure® 1591, Sancure® 2255, Sancure® 2260, Sancure® 2310, Sancure® 2725, and Sancure® 2016 (all commercially available from Lubrizol Inc.).

Other examples of commercially-available polyurethanes can include NeoPac® R-9000, R-9699, and R-9030 (available from Zeneca Resins, Ohio), Printrite® DP376 and Sancure® AU4010 (available from Lubrizol Advanced Materials, Inc., Ohio), and Hybridur® 570 (available from Air Products and Chemicals Inc., Pennsylvania).

In some examples, the first and/or the second polymeric network comprises epoxy-functional additives. Epoxy-functional additives can include alkyl and aromatic epoxy resins or epoxy-functional resins, such as for example, epoxy novolac resin(s) and other epoxy resin derivatives. Epoxy-functional molecules can include at least one, or two or more pendant epoxy moieties. The molecules can be aliphatic or aromatic, linear, branched, cyclic or acyclic. If cyclic structures are present, they may be linked to other cyclic structures by single bonds, linking moieties, bridge structures, pyro moieties, and the like. Examples of suitable epoxy functional resins are commercially available and include, without limitation, Ancarez® AR555 (commercially available from Air Products), Ancarez® AR550, Epi-rez® 3510W60, Epi-rez® 3515W6, or Epi-rez® 3522W60 (commercially available from Hexion).

In some other examples, the polymeric network includes epoxy resin. Examples of suitable aqueous dispersions of epoxy resin include Waterpoxy® 1422 (commercially available from Cognis) or Ancarez® AR555 (commercially available from Air Products). The polymeric network can comprise epoxy resin hardeners. The examples of epoxy resin hardeners that can be used herein include liquid aliphatic or cycloaliphatic amine hardeners of various molecular weights, in 100% solids or in emulsion or water and solvent solution forms. Amine adducts with alcohols and phenols or emulsifiers can also be envisioned. Examples of suitable commercially available hardeners include Anquawhite 100 (from Air Products) and EPI-CURE® 8290-Y-60 (from Hexion). The polymeric network can include water-based polyamine as epoxy resin hardeners. Such epoxy resin hardeners can be, for examples, water-based polyfunctional amines, acids, acid anhydrides, phenols, alcohols and/or thiols. Other examples of commercially available polymeric networks that can be used herein includes the ingredients Araldite® PZ 3921 and/or Aradur® 3985 available from Huntsman.

In this disclosure, a method of using such coating composition onto a media base substrate is disclosed. Said composition can be used as a coating composition for a media substrate. The resulting coated printing media will show excellent image quality and durability on inkjet printing, especially latex based inkjet printing, while maintains good flame retardancy. In some examples, the coating composition described herein, can be applied to fabric-based substrate; when applied it will form a coating layer that can be called and that can form an image-receiving coating layer. In some other examples, the coating composition described herein, can be applied to fabric-based substrate, when applied it will form a coating layer that can be called and that can form an image-receiving coating layer. Such image-receiving coating layer can be applied to at least, one side of the substrate. In some examples, the image-receiving coating layer can be applied to both opposing side of the substrate.

The present disclosure relates thus also to a coated printable medium, with an image-side (101) and a back-side (102), comprising a base substrate (110) and a coating composition applied over, at least, one side of the base substrate, forming an image-receiving layer (120), and comprising water and polyurethane particles including cationic triphenyl-phosphonium salt functional groups. In some other examples, the base substrate is a fabric-based substrate.

The coating composition that comprises a flame-retardant polyurethane dispersion with cationic triphenyl phosphonium salt functional groups can be applied to a printable medium (100) in order to form an image-receiving layer (120). Such layer would act as the image-receiving layer since, during the printing process, the ink will be directly deposited on its surface. The coated printable medium (100) of the present disclosure, that can also be called herein printable recording media, is a media that comprises a base substrate (110). The base substrate (110) can also be called bottom supporting substrate or fabric substrate. The word "supporting" also refers to a physical objective of the substrate that is to carry the coatings layer and the image that is going to be printed. In some examples, the coated printable medium (100) of the present disclosure, is a fabric printable recording media, meaning that the base substrate (110) is a fabric-based substrate.

The coating compositions, coated print media, and methods of coating print media described herein can be suitable for use with textile of fabric media print substrate (110). In one example, textiles or fabrics can be treated with the coating compositions of the present disclosure, including cotton fibers, treated and untreated cotton substrates, polyester substrates, nylons, blended substrates thereof, etc. It is notable that the term "fabric substrate" or "fabric media substrate" does not include materials such as any paper (even though paper can include multiple types of natural and synthetic fibers or mixtures of both types of fibers). Example natural fiber fabrics that can be used include treated or untreated natural fabric textile substrates, e.g., wool, cotton, silk, linen, jute, flax, hemp, rayon fibers, thermoplastic aliphatic polymeric fibers derived from renewable resources such as cornstarch, tapioca products, or sugarcanes, etc. Example synthetic fibers that can be used include polymeric fibers such as nylon fibers (also referred to as polyamide fibers), polyvinyl chloride (PVC) fibers, PVC-free fibers made of polyester, polyamide, polyimide, polyacrylic, polypropylene, polyethylene, polyurethane, polystyrene, polyaramid, e.g., Kevlar® (E. I. du Pont de Nemours Company, USA), polytetrafluoroethylene, fiberglass, polytrimethylene, polycarbonate, polyethylene terephthalate, polyester terephthalate, polybutylene terephthalate, or a combination thereof. In some examples, the fiber can be a modified fiber from the above-listed polymers. The term "modified fiber" refers to one or both of the polymeric fiber and the fabric as a whole having undergone a chemical or physical process such as, but not limited to, copolymerization with monomers of other polymers, a chemical grafting reaction to contact a chemical functional group with one or both of the polymeric fiber and a surface of the fabric, a plasma treatment, a solvent treatment, acid etching, or a biological treatment, an enzyme treatment, or antimicrobial treatment to prevent biological degradation.

Thus, the fabric substrate can include natural fiber and synthetic fiber, e.g., cotton/polyester blend. The amount of each fiber type can vary. For example, the amount of the natural fiber can vary from about 5 wt % to about 95 wt % and the amount of synthetic fiber can range from about 5 wt % to 95 wt %. In yet another example, the amount of the natural fiber can vary from about 10 wt % to 80 wt % and the synthetic fiber can be present from about 20 wt % to about 90 wt %. In other examples, the amount of the natural fiber can be about 10 wt % to 90 wt % and the amount of synthetic fiber can also be about 10 wt % to about 90 wt %. Likewise, the ratio of natural fiber to synthetic fiber in the fabric substrate can vary. For example, the ratio of natural fiber to synthetic fiber can be 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, or vice versa. The fabric substrate can be in one of many different forms, including, for example, a textile, a cloth, a fabric material, fabric clothing, or other fabric product suitable for applying ink, and the fabric substrate can have any of a number of fabric structures, including structures that can have warp and weft, and/or can be woven, non-woven, knitted, tufted, crocheted, knotted, and pressured, for example. The terms "warp" as used herein, refers to lengthwise or longitudinal yarns on a loom, while "weft" refers to crosswise or transverse yarns on a loom.

The basis weight of the print media, such as the fabric or textile, can be from 20 gsm to 500 gsm, from 40 gsm to 400 gsm, from 50 gsm to 250 gsm, or from 75 gsm to 150 gsm, for example. Some media substrates can typically be toward the thinner end of the spectrum, and other media substrates may be thicker, and thus, the weight basis ranges given are provided by example, and are not intended to be limiting.

Regardless of the media substrate used, such substrates can contain or be coated with additives including, but not limited to, colorant (e.g., pigments, dyes, and tints), anti-static agents, brightening agents, nucleating agents, antioxidants, UV stabilizers, and/or fillers and lubricants, for example. Alternatively, the media substrates may be pre-treated in a solution containing the substances listed above before applying other treatments or coating layers.

The printable medium (100) of the present disclosure comprises a base substrate (110) and an image-receiving coating layer (120) applied over, at least, one side of the base substrate. The image-receiving coating layer is made of the coating composition described herein; i.e. that comprises water and polyurethane particles including cationic triphenyl-phosphonium salt functional groups. In some examples, a primary layer (130) containing polymeric binders can be further applied on, at least, one side of the base substrate below the image-receiving coating layer.

In some examples, the composition described is applied to an "uncoated" substrate. By "uncoated", it is meant herein that the media substrate has not been treated or coated by any composition and that the pre-treatment composition is applied directly of the substrate that constitute the media. In some other examples, the composition described is applied to a primary layer; i.e. a media that has already been coated with a primary layer coating layer composition.

In some examples, the printable medium of the present disclosure comprises a base substrate (110); a primary layer (130) and an image-receiving coating composition (120) wherein the primary layer (130) is applied directly on, at least, one side of the fabric base substrate (i.e. the image side), below the image-receiving coating composition. In some other examples, the primary layer is applied on both the image-side and the back-side of the media on fabric base substrate.

The printable medium can thus further comprise a primary layer containing polymeric binders applied on, at least, one side of the base substrate, over the fabric base substrate and below the image-receiving coating layer. In some other examples, the printable medium comprises a primary layer containing polymeric binders and surface tension control agent such as surfactants.

In some examples, the printable medium is a fabric printable medium that comprises a primary layer and an image-receiving coating layer, wherein both the primary layer and the image-receiving coating layer comprise the flame-retardant polyurethane dispersions with cationic tri-phenyl-phosphonium salt functional groups.

The coating composition of the present disclosure or the image-receiving coating composition can be applied at a coat-weight ranging from about 0.1 to about 40 gsm (gram per square meter) or at a coat-weight ranging or from about 1 to 20 gsm (gram per square meter) or at a coat-weight ranging or from about 2 to 10 gsm (gram per square meter) to a media base substrate in order to form an image-receiving layer (130). In some other examples, the image-receiving coating composition is applied to the primary layer at a thickness ranging from about 1 µm to about 50 µm with a dry coat-weight ranging from about 1 gsm to about 20 gsm to a media base substrate in order to form an image-receiving layer (130). In one example, when present, the primary layer (130) can be applied to the base substrate at a dry coat-weight ranging from about 1 gsm to about 80 gsm per side. In one other example, the primary layer (130) is applied, to the substrate, at a dry coat-weight ranging from about 5 gsm to about 60 gsm. In yet another example, the primary layer (130) is applied, to the substrate, at a dry coat-weight ranging from about 10 gsm to about 40 gsm.

The primary layer can comprise the polyurethane particles including cationic triphenyl-phosphonium salt functional groups, as defined above, and surface tension control agent like surfactants. In some examples, the polyurethane particles including cationic triphenyl-phosphonium salt functional groups is present, in the primary layer composition, in an amount representing from about 5 to about 85 wt % by total weigh of the primary layer composition. In some other examples, the he polyurethane particles including cationic triphenyl-phosphonium salt functional groups is present, in the primary layer composition, in an amount representing from about 10 wt % to about 70 wt %, by total dry weight of the primary layer composition. In yet some other examples, the he polyurethane particles including cationic triphenyl-phosphonium salt functional groups is present, in the primary layer composition, in an amount representing from about 15 wt % to about 55 wt %, by total dry weight of the primary layer composition.

The primary layer composition can further contain an optional polymeric binder. Without being linked by any theory, it is believed that the polymeric binder can enhance the film strength formed by polyurethane particles including cationic triphenyl-phosphonium salt functional groups and improve the coating adhesion between coating layers and the fabric substrate. The polymeric binder can be present, in the primary layer composition, in an amount ranging from about 5 wt % to about 70 wt % by total weigh of the primary layer composition.

The polymeric binder can be either water a soluble, a synthetic or a natural substance or an aqueous dispersible substance like polymeric latex. In some other examples, the polymeric binder is polymeric latex. The polymeric binder can be a water-soluble polymer or water dispersible polymeric latex. In some examples, the polymeric binder has a glass transition temperature (Tg) that is less than 5° C. Indeed, it is believed that polymeric binder with higher glass transition temperature (Tg) might contribute to a stiff coating and can damage the fabric "hand feeling" of the printing media. In some examples, the polymeric binders have a glass transition temperature (Tg) ranging from −40° C. to 0° C. In some other examples, the polymeric binders have a glass transition temperature (Tg) ranging from −20° C. to −5° C. The way of measuring the glass transition temperature (Tg) parameter is described in, for example, Polymer Handbook, 3rd Edition, authored by J. Brandrup, edited by E. H. Immergut, Wiley-Interscience, 1989. "Glass transition temperature" or "Tg," can be calculated by the Fox equation: copolymer $Tg=1/(Wa/(Tg\ A)+Wb(Tg\ B)+\ .\ .\ .\ )$ where Wa=weight fraction of monomer A in the copolymer and TgA is the homopolymer Tg value of monomer A, Wb=weight fraction of monomer B and TgB is the homopolymer Tg value of monomer B, etc. With polyurethane, the hard segments and soft segments can be used to calculate the glass transition temperature of the polymer with the hard and soft segments being calculated based on the various segments used as the homopolymer for the calculation.

In some examples, the polymeric binders are crossed-linked binder. "Crossed-linked binder" refers to the fact that multiple polymer substances with reactive function groups can react with each other to form a between-molecular chain structure, a cross linker, a macro-molecular substance or a low molecular weight chemical with more than two function groups that can be used. Binders with "self-crosslink" capability can mean that macro-molecular chains have different reactive function groups that can be used. The cross-linked binders can balance both softness and mechanical strength of the coating layers.

Suitable polymeric binders include, but are not limited to, water-soluble polymers such as polyvinyl alcohol, starch derivatives, gelatin, cellulose derivatives, acrylamide polymers, and water dispersible polymers such as acrylic polymers or copolymers, vinyl acetate latex, polyesters, vinylidene chloride latex, styrene-butadiene or acrylonitrile-butadiene copolymers. Non-limitative examples of suitable binders include styrene butadiene copolymer, polyacrylates, polyvinylacetates, polyacrylic acids, polyesters, polyvinyl alcohol, polystyrene, polymethacrylates, polyacrylic esters, polymethacrylic esters, polyurethanes, copolymers thereof, and combinations thereof. In some examples, the binder is a polymer or a copolymer selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. In a further example, the polymeric binder can include an acrylonitrile-butadiene latex.

In some other examples, the binder component is a latex containing particles of a vinyl acetate-based polymer, an acrylic polymer, a styrene polymer, an SBR-based polymer, a polyester-based polymer, a vinyl chloride-based polymer, or the like. In yet some other examples, the binder is a polymer or a copolymer selected from the group consisting of acrylic polymers, vinyl-acrylic copolymers and acrylic-polyurethane copolymers. Such binders can be polyvinylalcohol or copolymer of vinylpyrrolidone. The copolymer of vinylpyrrolidone can include various other copolymerized monomers, such as methyl acrylates, methyl methacrylate, ethyl acrylate, hydroxyethyl acrylate, hydroxyethyl methacrylate, ethylene, vinylacetates, vinylimidazole, vinylpyridine, vinylcaprolactams, methyl vinylether, maleic anhydride, vinylamides, vinylchloride, vinylidene chloride, dimethylaminoethyl methacrylate, acrylamide, methacrylamide, acrylonitrile, styrene, acrylic acid, sodium vinylsulfonate, vinylpropionate, and methyl vinylketone, etc. Examples of binders include, but are not limited to, polyvinyl alcohols and water-soluble copolymers thereof, e.g., copolymers of polyvinyl alcohol and poly(ethylene oxide) or copolymers of polyvinyl alcohol and polyvinylamine; cationic polyvinyl alcohols; aceto-acetylated polyvinyl alcohols; polyvinyl acetates; polyvinyl pyrrolidones including copolymers of polyvinyl pyrrolidone and polyvinyl acetate; gelatin; silyl-modified polyvinyl alcohol; styrene-butadiene copolymer; acrylic polymer latexes; ethylene-vinyl acetate copolymers; polyurethane resin; polyester resin; and combination thereof. In some examples, the binder is carboxylated styrene-butadiene copolymer binder. Such binder can be found commercially under the tradename Genflow® and Acrygen® from Omnova Solutions.

In one example, the polymeric binder may have an average molecular weight (Mw) of about 5,000 to about 200,000. In another example, the average molecular weight of the polymeric binder can vary from 10,000 Mw to about 200,000 Mw. In yet another example, the average molecular weight of the polymeric binder can vary from 20,000 Mw to 100,000 Mw. In a further example, the average molecular weight of the polymeric binder can vary from 100,000 Mw to 200,000 Mw. In one example, the polymeric binder can have a weight average molecular weight from 5,000 Mw to 200,000 Mw and can include polystyrene-butadiene emulsion, acrylonitrile butadiene latex, starch, gelatin, casein, soy protein polymer, carboxy-methyl cellulose, hydroxyethyl cellulose, acrylic emulsion, vinyl acetate emulsion, vinylidene chloride emulsion, polyester emulsion, polyvinyl pyrrolidine, polyvinyl alcohol, styrene butadiene emulsions, or combination thereof.

In some examples, the polymeric binder is a self-crosslinking aqueous acrylic dispersion such an Edolan® AB available from Tanatex Chemicals (having a solids content of 45% and Tg of −18° C.).

The printable medium, described herein, is prepared by using several surface treatment compositions herein named a coating layer or coating composition. A method of making a coated print medium includes applying a coating composition as a layer to a media substrate and drying the coating composition to remove water from the media substrate to leave an ink-receiving layer thereon. The coating composition includes water and polyurethane particles including cationic triphenyl-phosphonium salt functional groups.

In some examples, as illustrated in FIG. 4, the method (200) method of making a coated printable medium encompasses: applying a coating composition as a layer to a media substrate, the coating composition including water and polyurethane particles including cationic triphenyl-phosphonium salt functional groups (210); drying the coating composition to remove water from the media substrate to leave an ink-receiving layer thereon (220). In some examples, the media substrate is a fabric media substrate.

When applying the coating composition to a media substrate, the coating composition can be applied to any media substrate type using any method appropriate for the coating application properties, e.g., thickness, viscosity, etc. Non-limiting examples of methods include size press, slot die, blade coating, Meyer rod coating and padding coating. In another example, a two rolls padding coating is used to apply the coating composition to a fabric substrate (or other type of substrate). Subsequently, when the coating composition is dried, it can form an ink-receiving layer. Drying can be by air drying, heated airflow drying, baking, infrared heated drying, etc. Other processing methods and equipment can also be used. For one example, the coated media substrate can be passed between a pair of rollers, as part of a calendering process, after drying. The calendering device can be any kind of calendaring apparatus, including but not limited to off-line super-calender, on-line calender, soft-nip calender, hard-nip calender, or the like.

In further detail and by way of example, the ink-receiving layer can be formed on a media substrate with a dried coating weight from 0.5 grams/m2 (gsm) to 20 gsm, from 4 gsm to 18 gsm, from 5 gsm to 15 gsm, or from 6 gsm to 12 gsm. The coatings of the present disclosure can be applied with acceptable smoothness, as well to provide the ability of the coated media to absorb ink or to evenly distribute ink colorant, e.g., pigment. Furthermore, the coating composition, when applied to a media substrate as a coating there can act to favorably have an impact on media opacity, brightness, whiteness, glossiness, and/or surface smoothness of image-receiving layer in some examples.

The primary layer (130) and the image-receiving coating layer (120) can be dried using any drying method in the arts such as box hot air dryer. The dryer can be a single unit or could be in a serial of 3 to 7 units so that a temperature profile can be created with initial higher temperature (to remove excessive water) and mild temperature in end units (to ensure completely drying with a final moisture level of less than 1-5% for example). The peak dryer temperature can be programmed into a profile with higher temperature at begging of the drying when wet moisture is high and reduced to lower temperature when web becoming dry. The dryer temperature is controlled to a temperature of less than about 200° C. to avoid yellowing textile, and the fabric web temperature is controlled in the range of about 90 to about 180° C. In some examples, the operation speed of the coating/drying line is 20 to 30 meters per minute.

Once the coating compositions are applied to the base substrate and appropriately dried, ink compositions can be applied by any processes onto the printable medium. In some examples, the ink composition is applied to the printable medium via inkjet printing techniques. A printing method could encompasses obtaining a coated printable medium as defined herein and applying an ink composition onto said fabric printable medium to form a printed image. Said printed image will have, for instance, enhanced image quality and image permanence. In some examples, when needed, the printed image can be dried using any drying device attached to a printer such as, for instance, an IR heater.

In some examples, the ink composition is an inkjet ink composition that contains one or more colorants that impart the desired color to the printed message and a liquid vehicle. As used herein, "colorant" includes dyes, pigments, and/or other particulates that may be suspended or dissolved in an ink vehicle. The colorant can be present in the ink composition in an amount required to produce the desired contrast and readability. In some examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition, applied to the printable medium, is an ink composition containing latex components. Latex components are, for examples, polymeric latex particulates. The ink composition may contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, nonionic, or amphoteric polymeric latex. Monomers that are often used to make synthetic latexes include ethyl acrylate; ethyl methacrylate; benzyl acrylate; benzyl methacrylate; propyl acrylate; methyl methacrylate, propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxy-propyhiethyl-dimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate.

In some examples, the latexes are prepared by latex emulsion polymerization and have an average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, polystyrene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

It is noted that, as used in this specification and the appended claims, the singular forms "a," "an," and "the" include plural referents unless the content clearly dictates otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

EXAMPLES

The raw materials and chemical components used in the illustrating samples are listed in Table 2.

TABLE 2

| Ingredients | Nature of the ingredients | Supplier |
| --- | --- | --- |
| Araldite ® PZ 3901 | Cross-linked polymeric network | Hundtsman Inc. |
| Aradur ® 3985 | Cross-linked polymeric network | Hundtsman Inc. |
| Byk-Dynwet ® 800 | silicone-free wetting agent | BYK Inc. |
| Sancure ® 2016 | Polyurethane polymer | Lubrizol Inc. |
| Sancure ® 4010 | Self-Crosslinking aliphatic polyurethane-acrylic network | Lubrizol Inc. |
| Foamaster ® MO2185 | De-former | BASF Co. |
| Genflow ® 3000 | carboxylated styrene-butadiene copolymer binder | Omnova Solutions |
| SpaceRite ® S-3 | Filler & flame retardant in powder form | Huber |

Example 1—Preparation of Printable Medium Samples

Different media were made using the different fire-retardant dispersion formulations. The illustrating media samples 1, 2 and 3 are fabric print medium in accordance with the principles described herein. Samples 4 and 5 are comparative examples. The media sample structures are illustrated in Table 3. Samples 1 and 2 have a transparent coating. Sample 3 has an opaque coating. Each sample has a support base structure (110) which is a 100% woven polyester fabric (with plain weave) having a weight of 130 gsm and thickness of 175 micrometers (μm), an image-receiving coating layer (120) and a primary layer (130).

TABLE 3

| Media | Image-receiving coating layer (120) | Primary layer (130) | base structure (110) |
|---|---|---|---|
| sample 1 | IRL 1 | none | 100% woven polyester fabric |
| sample 2 | IRL 2 | none | 100% woven polyester fabric |
| sample 3 | IRL 2 | PL A | 100% woven polyester fabric |
| sample 4 (comp.) | IRL 3 | none | 100% woven polyester fabric |
| sample 5 (comp.) | IRL 3 | PL B | 100% woven polyester fabric |

The formulation of the image-receiving coating layer (120) and of the primary layer (130) are illustrated in Tables 4 and 5 below. Each amount ingredient is expressed in parts by dry weight.

TABLE 4

| | Image-receiving coating layer (120) | | |
|---|---|---|---|
| Ingredient | IRL-1 | IRL-2 | IRL-3 |
| Byk-Dynwet ® 800 | 0.8 | 0.8 | 0.8 |
| Araldite ® PZ 3901 | 2 | 2 | 2 |
| Aradur ® 3985 | 2 | 2 | 2 |
| Sancure ® 2016 | — | — | 11 |
| Sancure ® 4010 | 2 | 2 | 2 |
| FR dispersion PUD-1 | 11 | — | — |
| FR dispersion PUD-2 | — | 11 | — |
| Foamaster | 0.6 | 0.6 | 0.6 |

TABLE 5

| | Primary layer (130) | |
|---|---|---|
| Ingredient | PL-A | PL-B |
| Byk-Dynwet 800 | 0.8 | 0.8 |
| Foamaster | 0.5 | 0.5 |
| SpaceRit-3 | 100 | 100 |
| Genflow ® 3000 | — | 20 |
| FR dispersion PUD-1 | 20 | — |

Example 2—Samples Performances

The same images are printed on the experimental media samples 1, 2 and 3 and Comparison Samples 4 and 5 using a HP® DesignJet L360 Printer equipped with HP 789 ink cartridge (HP Inc.). The printer is set with a heating zone temperature at about 50° C., a cure zone temperature at about 110° C., and an air flow at about 15%. The printed fabric mediums are evaluated for different performances: image quality and image durability. The results of these tests are expressed in the Table 6 below.

TABLE 6

| | Image Quality | | | Image Durability | | | | |
|---|---|---|---|---|---|---|---|---|
| Sample ID | Gamut | ink bleed | Gloss | ink transfer | coin scratch | rub. res. | wrinkle res. | folding res. |
| Sample 1 | 484K | 4 | 3 | 5 | 4.5 | 5 | 4 | 4 |
| Sample 2 | 467K | 4 | 3 | 5 | 5 | 5 | 4 | 4 |
| Sample 3 | 507K | 5 | 4 | 5 | 5 | 5 | 3 | 4 |
| Sample 4 | 435K | 4 | 3 | 5 | 5 | 5 | 4 | 4 |
| Sample 5 | 528K | 5 | 4 | 5 | 5 | 5 | 3 | 4 |

Image quality is evaluated using both numeric measurement method and visual evaluation method. The image quality of the prints is measured with Gamut, Ink bleed and image gloss test. The Ink bleed and Ink gloss are evaluated visually from the printed samples using a scale of 1-5 (with 1 being the worst and 5 being the best). Gamut Measurement represents the amount of color space covered by the ink on the media sample (a measure of color richness). The gamut is measured on Macbeth®TD904 (Micro Precision Test Equipment, California) (A higher value indicates better color richness). The image gloss is evaluated using spectrophotometer (such as the X-Rite i1/i0) and single-angle gloss-meter (such as the BYK Gloss-meter).

Image Durability is with rub resistance, coin scratch, wrinkle resistance, folding resistance and ink transfer tests. Rub resistance testing is carried out using an abrasion scrub tester (per ASTM D4828 method): fabrics are printed with small patches of all available colors (cyan, magenta, yellow, black, green, red, and blue). A weight of 250 g is loaded on the test header. The test tip is made of acrylic resin with crock cloth. The test cycle speed is 25 cm/min and 5 cycles are carried out for each sample at an 8-inch length for each cycle. The test probe is in dry (dry rub) or wet (wet rub) mode. Coin scratch test is performed by exposing the various samples to be tested to a 45-degree coin scratching under a normal force of 800 g. The test is done in a BYK Abrasion Tester (from BYK-Gardner USA, Columbus, MD) with a linear, back-and-forth action, attempting to scratch off the image-side of the samples (5 cycles). The image durability is evaluated visually from the printed samples using a scale of 1-5 (with 1 being the worst and 5 being the best).

The printed image sample are also evaluated for their flame-resistance properties. Such analyze is done per NFPA 701 Standard which measures the ignition resistance of a fabric printing media after it is exposed to a flame for 12 seconds. The flame, char length, and flaming residue are recorded. The results of these tests are expressed in the Table 7 below.

TABLE 7

| Sample ID | Weight loss (%) | Residual flame time (s) |
|---|---|---|
| Sample 1 | 29.0 | 4.2 |
| Sample 2 | 18.5 | 2.7 |
| Sample 3 | 12.6 | 0.7 |
| Sample 4 | 40.8 | 18.8 |
| Sample 5 | 63.1 | 24.1 |

Example 3—Synthesis of Flame-Retardant Polyurethane Emulsions

Synthesis of FR-PUD-1: 72.551 g of polyester diol (Stepanpol® PC-1015-55), 10.677 g of isophorone diisocyanate (IPDI), and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of bismuth catalyst (Reaxis® C3203) was added to initiate the polymerization. Polymerization was continued for 3 hours at 75° C. 0.5 g samples were withdrawn for % NCO titration to confirm the reaction. 8.861 g of poly (ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 0.92%. The theoretical % NCO should be 0.94%. 7.911 g of hydroxyethyl-triphenyl-phosphonium bromide (HETPPB) in 20 ml of acetone was added over 10 min. After 60 min, the polymerization temperature was reduced to 50° C. and then 217.322 of DI water was added over 20 min. The solution became milky and white color and the milky dispersion was continued to stir for overnight at room temperature. The PUD dispersion was filtered through 400 mesh stainless sieve. Acetone was removed with Rotorvap® at 50° C. (add 2 drops (20 mg) BYK-011 de-foaming agent). The final PUD dispersion was filtered through fiber glass filter paper. Particle size measured by Malvern Zetasizer is 19 µm. The pH of the PUD dispersion was 5.5. Solid content was 35.5%.

Synthesis of FR-PUD-2: 73.243 g of polyester diol (Stepanpol® PC-1015-55), 10.779 g of isophorone diisocyanate (IPDI), and 64 g of acetone were mixed in a 500 ml of 4-neck round bottom flask. A mechanical stirrer with glass rod and Teflon blade was attached. A condenser was attached. The flask was immersed in a constant temperature bath at 75° C. The system was kept under drying tube. 3 drops of bismuth catalyst (Reaxis® C3203) was added to initiate the polymerization. Polymerization was continued for 3 hours at 75° C. 0.5 g samples were withdrawn for % NCO titration to confirm the reaction. 8.945 g of poly (ethylene glycol) methyl ether (Mn=2000) in 10 g of acetone was added to the reactor. The polymerization was continued 3 hours at 75° C. 0.5 g of pre-polymer was withdrawn for final % NCO titration. The measured NCO value was 0.92%. The theoretical % NCO should be 0.94%. 7.033 g of hydroxylethyl-triphenyl-phosphonium chloride (HETPPCl) in 20 ml of acetone was added over 10 min. After 60 min, the polymerization temperature was reduced to 50° C. and then 217.322 of DI water was added over 20 min. The solution became milky and white color and the milky dispersion was continued to stir for overnight at room temperature. The PUD dispersion was filtered through 400 mesh stainless sieve. Acetone was removed with Rotorvap® at 50° C. (add 2 drops (20 mg) BYK-011 de-foaming agent). The final PUD dispersion was filtered through fiber glass filter paper. Particle size measured by Malvern Zetasizer is 3.6 µm. The pH of the PUD dispersion was 5.0. Solid content was 34.2%.

The invention claimed is:

1. A coating composition for fabric printable media, comprising an aqueous dispersion of polyurethane particles including a backbone polymer with urethane linkages and cationic triphenyl-phosphonium salt functional groups attached to the backbone polymer.

2. The coating composition of claim 1 wherein the polyurethane particles further include isocyanate-generated amine groups and polyalkylene oxide side-chains attached to the backbone polymer.

3. The coating composition of claim 2 wherein the polyalkylene oxide side-chains are polyethylene oxide side-chains, polypropylene oxide side-chains, or a combination thereof.

4. The coating composition of claim 1 wherein the polyurethane particles have a D50 particle size that is over 1 µm.

5. The coating composition of claim 1 wherein the polyurethane particles have an acid number of about 0 mg KOH/g.

6. The coating composition of claim 1 wherein the polyurethane particles have an acid number of about 0 mg KOH/g, have a D50 particle size that is over 1 µm, and have polyalkylene oxide side-chains attached to the backbone polymer.

7. The coating composition of claim 1 further comprising first and second crosslinked polymeric networks.

8. A coated printable fabric, with an image-side and a back-side, the coated printable fabric comprising:
   a. a fabric substrate; and
   b. a coating composition applied over at least one side of the fabric substrate to form an image-receiving layer, the coating composition comprising an aqueous dispersion of polyurethane particles including a backbone polymer with urethane linkages and cationic triphenyl-phosphonium salt functional groups attached to the backbone polymer.

9. The coated printable fabric of claim 8 wherein the polyurethane particles further include isocyanate-generated amine groups and polyalkylene oxide side-chains attached to the backbone polymer.

10. The coated printable fabric of claim 8 wherein the coating composition comprises a first crosslinked polymeric network and a second crosslinked polymeric network that is different from the first crosslinked polymeric network, and wherein the first and second crosslinked polymeric networks independently include polyacrylate, polyurethane, vinylurethane, acrylic urethane, polyurethane-acrylic, polyether polyurethane, polyester polyurethane, polycaprolactam polyurethane, polyether polyurethane, alkyl epoxy resin, epoxy novolac resin, polyglycidyl resin, polyoxirane resin, polyamine, styrene maleic anhydride, a derivative thereof, or a combination thereof.

11. The coated printable fabric of claim 8 further comprising a primary layer applied on at least one side of the fabric substrate and between the fabric substrate and the image-receiving layer, and wherein the primary layer contains polymeric binders.

12. The coated printable fabric of claim 11 wherein both the primary layer and the image-receiving layer comprise the polyurethane particles including the cationic triphenyl-phosphonium salt functional groups.

13. The coated printable fabric of claim 11 wherein the polymeric binders are polymers or copolymers selected from the group consisting of acrylic polymers, acrylic copolymers, vinyl acetate polymers, vinyl acetate copolymers, polyester polymers, polyester copolymers, vinylidene chloride polymers, vinylidene chloride copolymers, butadiene polymers, butadiene copolymers, styrene-butadiene polymers, styrene-butadiene copolymers, acrylonitrile-butadiene polymers, and acrylonitrile-butadiene copolymers.

14. A method of making a coated printable fabric, the method comprising:

a. applying a coating composition as a layer to a fabric substrate, the coating composition including an aqueous dispersion of polyurethane particles including a backbone polymer with urethane linkages and cationic triphenyl-phosphonium salt functional groups attached to the backbone polymer; and b. drying the coating composition to remove water from the fabric substrate to leave an ink-receiving layer thereon.

15. The coating composition of claim 1 wherein the polyurethane particles have an average particle size of about 19 μm, and wherein the aqueous dispersion has a pH of about 5.5 and a solid content of about 35.5%.

16. The coating composition of claim 1 wherein the polyurethane particles have an average particle size of about 3.6 μm, and wherein the aqueous dispersion has a pH of about 5 and a solid content of about 34.2%.

17. The coating composition of claim 7 wherein the first crosslinked polymeric network is an epoxy resin and the second polymeric network is a self-crosslinking aliphatic polyurethane-acrylic network.

18. The coating composition of claim 1 wherein the cationic triphenyl-phosphonium salt functional groups are pendant groups attached to the backbone polymer.

\* \* \* \* \*